W. O. DEYERLE.
HOE.
APPLICATION FILED APR. 24, 1915.
1,185,070.
Patented May 30, 1916.
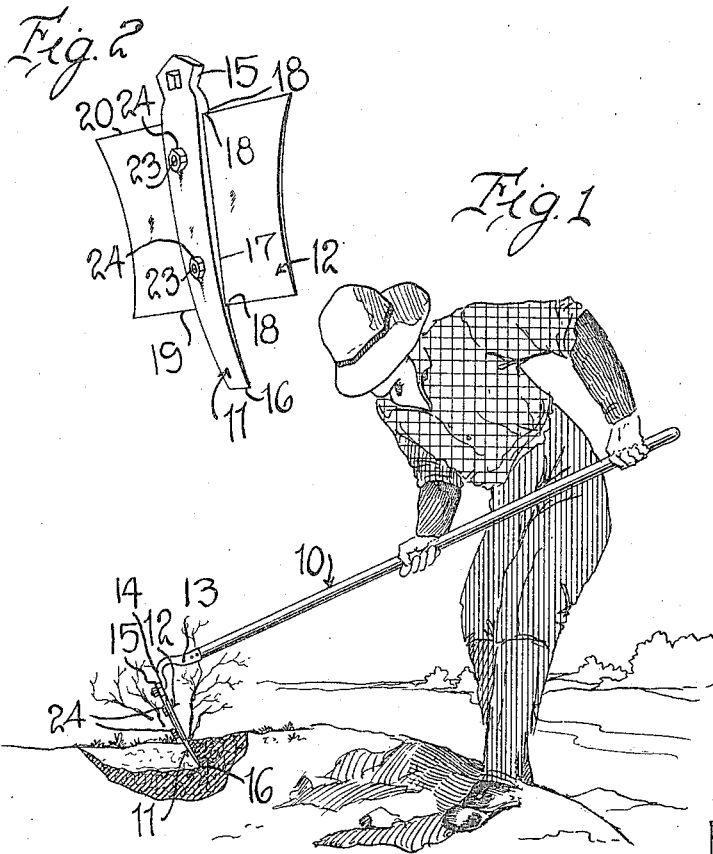
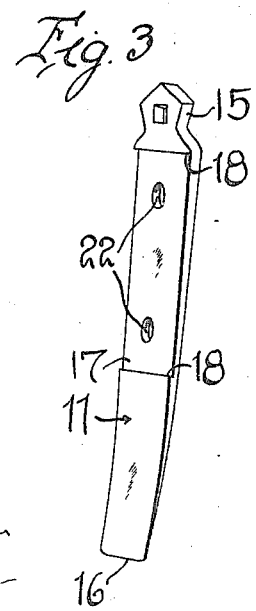
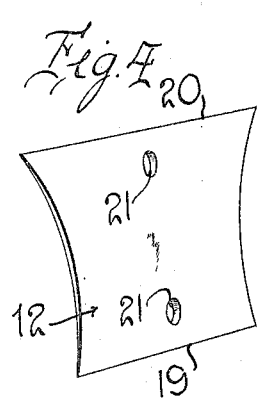
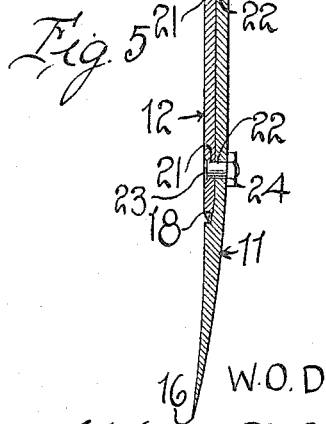
Inventor
W. O. DEYERLE
By Watson E. Coleman
Attorney

UNITED STATES PATENT OFFICE.

WILLIAM O. DEYERLE, OF SALEM, VIRGINIA.

HOE.

1,185,070.　　　　Specification of Letters Patent.　　Patented May 30, 1916.

Application filed April 24, 1915.　Serial No. 23,679.

*To all whom it may concern:*

Be it known that I, WILLIAM O. DEYERLE, a citizen of the United States, residing at Salem, in the county of Roanoke and State of Virginia, have invented certain new and useful Improvements in Hoes, of which the following is a specification, reference being had to the accompanying drawings.

My present invention relates broadly to new and useful improvements in garden implements and has particular reference to hoes.

One of the primary objects of the invention is to provide a hoe which may be employed for simultaneously cutting the weeds and sub-soiling the ground between the rows of vegetables. A more specific object of the invention is to provide a hoe which consists essentially in a surface blade and a sub-soiler blade, the former of which is adapted to cut the weeds and to break the surface of the ground and the latter of which is adapted to dig more deeply for the purpose of breaking up the sub-soil or performing the so-called sub-soiling operation.

Another object is to detachably secure the surface blade to the sub-soiler blade so that when desired, the surface blade may be removed and the sub-soiler blade employed by itself, in working onions or other vegetables which are planted very closely together.

A still further object is to provide a removable surface blade which is of substantially trapezoidal form, the two parallel edges of the blade being sharpened so that the user of the hoe may work the ground with a relatively wide or a relatively narrow surface blade, as conditions may demand.

The above, and other incidental objects of a similar nature, which will be hereinafter more specifically treated, are accomplished by such means as are illustrated in the accompanying drawings, described in the following specification, and then more particularly pointed out in the claims which are appended hereto and form part of this application.

With reference to the drawings, wherein there has been illustrated the preferred embodiment of this invention, as it is reduced to practice, and throughout the several views of which similar reference numerals designate corresponding parts, Figure 1 is a perspective view of the hoe with the shorter cutting edge of the surface blade arranged for engagement with the ground; Fig. 2 is a perspective view of the hoe with the handle removed; Fig. 3 is a detail perspective view of the sub-soiler blade; Fig. 4 is a detail perspective view of the surface blade; and Fig. 5 is a longitudinal section taken through the sub-soiler blade, with the surface blade attached thereto.

As best disclosed as an entirety in Fig. 1 of the accompanying drawings, the implement includes a handle 10, a sub-soiler 11 and a surface blade 12. The handle 10 is of conventional design, being provided at its terminal with a ferrule 13 from which extends a hook-shaped shank 14. The shank 14 is adapted to be detachably connected with the socket 15 of the sub-soiler blade.

Preferably, the sub-soiler blade is given a slight longitudinal curvature so that it may better withstand the strain and shocks which it receives during use. The lower end of the sub-soiler blade is tapered, producing a straight, sharpened, cutting edge 16. On the rear face of the sub-soiler blade is formed a recess 17, the end walls of which indicated at 18, form shoulders against which may be seated the upper and lower edges of the surface blade.

The surface blade, as illustrated in detail in Fig. 4, is substantially trapezoidal in shape and is formed of a relatively thin plate of metal, preferably tempered steel. The non-parallel edges of the blade may, if desired, be slightly curved, as in Fig. 4. The parallel edge portions of the blade are beveled on each face to produce the cutting edges 19 and 20. When the surface blade is to be employed, it is disposed within the recess 17 with the apertures 21 in alinement with the apertures 22 of the sub-soiler. The holding screws 23 are then inserted through the registering openings and nuts 24 are applied to the screws.

It is now to be observed that the surface blade may be disposed so that its shorter cutting edge 19 will engage the ground or may be inverted to dispose its longer cutting edge 20 for engagement with the ground. It is also to be observed that the surface blade may be entirely removed, whereby the sub-soiler blade may be employed by itself as a grubbing hoe for digging out roots or the like.

From the foregoing description and after a perusal of the accompanying drawings, the manner in which the implement is employed will now be readily discerned, for it will be seen that when the surface blade and sub-soiler blade are employed together, the sub-soiler blade will dig deeply into the ground, loosening the sub-soil while the surface blade will cut the weeds and the like and crush the clods and crust on the surface of the ground.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in the details of construction, proportion and arrangement of parts may be resorted to, when required, without sacrificing any of the advantages of this invention, as defined by the appended claims.

What is claimed is:—

1. A hoe including a handle, a relatively narrow sub-soiling blade connected at its upper end to the handle and extending at an angle thereto, the blade having a relatively sharp cutting edge and being of uniform width and recessed upon its inner face, the lower edge of the recess being above the lower edge of the blade, a surface blade normally disposed in the recess and extending out on each side of the sub-soiling blade, and means removably holding the surface blade in position in said recess.

2. A hoe including a handle, a relatively narrow sub-soiling blade connected at its upper end to the handle and extending at an angle thereto, the blade having a relatively sharp cutting edge and being of uniform width, the inner face of the blade being longitudinally recessed, the lower edge of the recess being above the lower edge of the sub-soiling blade, and a surface blade normally disposed in said recess and extending on each side beyond the sub-soiling blade, said surface blade having upper and lower parallel cutting edges and said surface blade being reversible in the recess and detachably connected to the sub-soiling blade.

3. A hoe including a handle, a relatively narrow sub-soiling blade connected at its upper end to the handle and extending at an angle thereto, the blade having a relatively sharp cutting edge and being recessed upon one face, the lower edge of the recess being above the lower edge of the blade, and a surface blade normally disposed in the recess and extending out on each side of the sub-soiling blade and having a straight lower edge approximately at right angles to the longitudinal axis of the sub-soiling blade, and means removably holding the surface blade in position in said recess.

4. A hoe including a handle, a relatively narrow sub-soiling blade connected at its upper end to the handle and extending at an angle thereto, the blade having a relatively sharp cutting edge and being of uniform width, the inner face of the blade being recessed, the recess being defined by shoulders, a surface blade normally disposed in said recess, said blade being approximately trapezoidal in shape to provide parallel cutting edges of different lengths, the surface blade being reversible in the recess to thereby dispose either edge adjacent to the cutting edge of the sub-soiling blade, the edges of the surface blade bearing against the shoulders of the recess, and bolts passing through the surface blade and through said sub-soiling blade.

In testimony whereof I hereunto affix my signature in the presence of two witnesses.

WILLIAM O. DEYERLE.

Witnesses:
CHAS. W. COOK,
S. R. GUY.

Copies of this patent may be obtained for five cents each, by addressing the "Commissioner of Patents, Washington, D. C."